United States Patent
Ouziel et al.

(10) Patent No.: US 9,690,591 B2
(45) Date of Patent: Jun. 27, 2017

(54) SYSTEM AND METHOD FOR FUSING INSTRUCTIONS QUEUED DURING A TIME WINDOW DEFINED BY A DELAY COUNTER

(75) Inventors: Ido Ouziel, Zrufa (IL); Lihu Rappoport, Haifa (IL); Robert Valentine, Kiryat Tivou (IL); Ron Gabor, Raanana (IL); Pankaj Raghuvanshi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1320 days.

(21) Appl. No.: 12/290,395

(22) Filed: Oct. 30, 2008

(65) Prior Publication Data

US 2010/0115248 A1  May 6, 2010

(51) Int. Cl.
| | |
|---|---|
| *G06F 9/30* | (2006.01) |
| *G06F 9/38* | (2006.01) |
| *G06F 12/084* | (2016.01) |
| *G06F 12/0875* | (2016.01) |
| *G06F 13/40* | (2006.01) |

(52) U.S. Cl.
CPC .......... *G06F 9/3853* (2013.01); *G06F 9/3016* (2013.01); *G06F 9/3017* (2013.01); *G06F 9/3836* (2013.01); *G06F 12/084* (2013.01); *G06F 12/0875* (2013.01); *G06F 13/4063* (2013.01); *G06F 2212/452* (2013.01); *G06F 2212/62* (2013.01); *Y02B 60/1228* (2013.01); *Y02B 60/1235* (2013.01)

(58) Field of Classification Search
CPC . G06F 9/00; G06F 9/30; G06F 9/3836; G06F 9/3017; G06F 9/3853
USPC .......................................... 712/214, 215, 220
See application file for complete search history.

(56) References Cited

U.S. PATENT DOCUMENTS

| | | |
|---|---|---|
| 5,230,050 A | 7/1993 | Itsuka et al. |
| 5,392,228 A | 2/1995 | Burgess et al. |
| 5,850,552 A | 12/1998 | Odani et al. |
| 5,860,107 A * | 1/1999 | Patel .............................. 711/140 |
| 5,860,154 A | 1/1999 | Abramson et al. |
| 5,903,761 A | 5/1999 | Tyma |
| 5,957,997 A | 9/1999 | Olson et al. |
| 6,006,324 A | 12/1999 | Tran et al. |
| 6,018,799 A | 1/2000 | Wallace et al. |
| 6,041,403 A | 3/2000 | Parker et al. |

(Continued)

FOREIGN PATENT DOCUMENTS

| | | |
|---|---|---|
| CN | 1178941 A | 4/1998 |
| CN | 1561480 A | 1/2005 |

(Continued)

OTHER PUBLICATIONS

Intel, "The Intel Pentium M Processor: Microarchitecture and Performance", Intel Technology Journal, vol. 7, Issue 2, May 21, 2003, pp. 21-36.*

(Continued)

*Primary Examiner* — David J Huisman
(74) *Attorney, Agent, or Firm* — NDWE LLP

(57) ABSTRACT

A technique to enable efficient instruction fusion within a computer system is disclosed. In one embodiment, processor logic delays the processing of a first instruction for a threshold amount of time if the first instruction within an instruction queue is fusible with a second instruction.

15 Claims, 6 Drawing Sheets

(56) References Cited

U.S. PATENT DOCUMENTS

| | | | |
|---|---|---|---|
| 6,151,618 | A | 11/2000 | Wahbe et al. |
| 6,247,113 | B1 | 6/2001 | Jaggar |
| 6,282,634 | B1 | 8/2001 | Hinds et al. |
| 6,338,136 | B1 * | 1/2002 | Col et al. ............... 712/221 |
| 6,647,489 | B1 | 11/2003 | Col et al. |
| 6,675,376 | B2 | 1/2004 | Ronen et al. |
| 6,718,440 | B2 | 4/2004 | Maiyuran et al. |
| 6,742,110 | B2 | 5/2004 | Djafarian et al. |
| 6,889,318 | B1 | 5/2005 | Wichman |
| 6,920,546 | B2 | 7/2005 | Gochman et al. |
| 7,051,190 | B2 | 5/2006 | Samra et al. |
| 7,937,564 | B1 | 5/2011 | Ashcraft et al. |
| 2003/0023960 | A1 | 1/2003 | Khan et al. |
| 2003/0065887 | A1 | 4/2003 | Maiyuran et al. |
| 2003/0236967 | A1 | 12/2003 | Samra et al. |
| 2004/0128485 | A1 | 7/2004 | Nelson |
| 2004/0139429 | A1 | 7/2004 | Ronen et al. |
| 2006/0098022 | A1 | 5/2006 | Andrews et al. |
| 2007/0174314 | A1 | 7/2007 | McSherry et al. |
| 2008/0256162 | A1 | 10/2008 | Henry et al. |

FOREIGN PATENT DOCUMENTS

| | | | |
|---|---|---|---|
| JP | 10124391 | A | 5/1998 |
| JP | 2003091414 | A | 3/2003 |
| JP | 3866918 | B2 | 1/2007 |
| KR | 20050113499 | A | 12/2005 |
| TW | 200424933 | A | 11/2004 |

OTHER PUBLICATIONS

International Search Report and Written Opinion; International Application No. PCT/US2009/062219, Korean Intellectual Property Office, Government Complex-Daejeon, 139 Seonsa-ro, Seogu, Daejeon 302-701, Republic of Korea; May 17, 2010; 7 pages.

Ma et al., "Design of a Machine-Independent Optimizing System for Emulator Development," TRW Systems Group and T.G. Lewis, Oregon State University, ACM Transactions on Programming Languages and Systems, vol. 2, No. 2, Apr. 1980, pp. 239-262.

Keshava et al., "Pentium RTM III Processor Implementation Tradeoffs," Microprocessor Products Group, Intel Technology Journal Q2, 1999, Intel Corporation, 11 pages.

Kaanellos, "Intel's P6 Chip Architecture Not Dead Yet," CNET News.com, Oct. 15, 2001, 1:00 PM PT, 3 pages.

First Office Action and Search Report from counterpart Chinese Patent Application No. 201410054184.X mailed Dec. 30, 2015, 35 pages.

Second Office Action from counterpart Chinese Patent Application No. 200910253081.5 mailed Apr. 7, 2013, 11 pages.

Third Office Action from counterpart Chinese Patent Application No. 200910253081.5 mailed Apr. 16, 2015, 4 pages.

First Office Action from counterpart German Patent Application No. 10 2009 051 388.4-53 mailed Jun. 25, 2012, 29 pages.

Primary Office Action and Search Report from counterpart Taiwan Patent Application No. 098136712 mailed Sep. 6, 2013, 18 pages.

Second Office Action from counterpart Taiwan Patent Application No. 098136712 mailed Nov. 18, 2013, 10 pages.

First Office Action from counterpart Korean Patent Application No. 2011-7007623 mailed Jul. 19, 2012, 4 pages.

Office Action from counterpart Japanese Patent Application No. 2014-241108 mailed Sep. 29, 2015, 15 pages.

Decision on Rejection from counterpart Chinese Patent Application No. 200910253081.5 mailed Oct. 10, 2013, 17 pages.

Decision to Grant a Patent from counterpart Japanese Patent Application No. 2014-241108 mailed Feb. 9, 2016, 3 pages, with concise explanation of relevance.

Hiroshige Goto, CPU in 2006, third, "Intel brings an approach of CISC into an architecture," ASCII, May 1, 2006, vol. 30, No. 5, pp. 114-119, with concise explanation of relevance.

Lee, Ian, Dynamic Instruction Fusion, URL: http://escholarship.org/uc/item/41x2x382, Dec. 2012, pp. 1-59.

International Preliminary Report on Patentability for International Application No. PCT/US2009/062219, mailed May 3, 2011, 5 pages.

Lipovski et al., "A Fetch-And-Op Implementation for Parallel Computers" ISCA '88 Proceedings of the 15th Annual International Symposium on Computer Architecture (1988), pp. 384-392.

Milo M., CIS 501 Introduction to Computer Architecture, Unit 7: Multiple Issue and Static Scheduling, URL: http://www.cis.upenn.edu/-milon/cis501-Fall05/lectures/07_wideissue.pdf, (2005) 19 pages.

Second Office Action from counterpart Chinese Patent Application No. 201410054184.X mailed Sep. 8, 2016, 17 pages.

"The P6 Architecture: Background Information for Developers," Copyright 1995, Intel Corporation, 20 pages.

* cited by examiner

SYSTEM AND METHOD FOR FUSING INSTRUCTIONS QUEUED DURING A TIME WINDOW DEFINED BY A DELAY COUNTER

FIELD OF THE INVENTION

Embodiments of the invention relate generally to the field of information processing and more specifically, to the field of instruction fusion in computing systems and microprocessors.

BACKGROUND

Instruction fusion is a process that combines two instructions into a single instruction which results in a one operation (or micro-operation, "uop") sequence within a processor. Instructions stored in a processor instruction queue (IQ) may be "fused" after being read out of the IQ and before being sent to instruction decoders or after being decoded by the instruction decoders. Typically, instruction fusion occurring before the instruction is decoded is referred to as "macro-fusion", whereas instruction fusion occurring after the instruction is decoded (into uops, for example) is referred to as "micro-fusion". An example of macro-fusion is the combining of a compare ("CMP") instruction or test instruction ("TEST") ("CMP/TEST") with a conditional jump ("JCC") instruction. CMP/TEST and JCC instruction pairs may occur regularly in programs at the end of loops, for example, where a comparison is made and, based on the outcome of a comparison, a branch is taken or not taken. Since macro-fusion may effectively increase instruction throughput, it may be desirable to find as many opportunities to fuse instructions as possible.

For instruction fusion opportunities to be found in some prior art processor microarchitectures, both the CMP/TEST and JCC instructions may need to reside in the IQ concurrently so that they can be fused when the instructions are read from the IQ. However, if there is a fusible CMP/TEST instruction in the IQ and no further instructions have been written to the IQ (i.e. the CMP/TEST instruction is the last instruction in the IQ), the CMP/TEST instruction may be read from the IQ and sent to the decoder without being fused, even if the next instruction in program order is a JCC instruction. An example where a missed fusion opportunity may occur is if the CMP/TEST and the JCC happen to be across a storage boundary (e.g., 16 byte boundary), causing the CMP/TEST to be written in the IQ in one cycle and the JCC to be written the following cycle. In this case, if there are no stalling conditions, the JCC will be written in the IQ at the same time or after the CMP/TEST is being read from the IQ, so a fusion opportunity will be missed, resulting in multiple unnecessary reads of the IQ, reduced instruction throughput, and excessive power consumption.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Embodiments of the invention may be used to improve instruction throughput in a processor and/or reduce power consumption of the processor. In one embodiment, what would otherwise be missed opportunities for instruction fusion are found, and instruction fusion may occur as a result. In one embodiment, would-be missed instruction fusion opportunities are found by delaying reading of a last instruction from an instruction queue (IQ) or the issuance of the last instruction read from the IQ to a decoding phase for a threshold number of cycles, so that any subsequent fusible instructions may be fetched and stored in the IQ (or at least identified without necessarily being stored in the IQ) and subsequently fused with the last fusible instruction. In one embodiment, delaying the reading or issuance of a first fusible instruction by a threshold number of cycles may improve processor performance, since doing so may avoid two, otherwise fusible, instructions being decoded and processed separately rather than as a single instruction.

The choice of the threshold number of wait cycles may depend upon the microarchitecture in which a particular embodiment is used. For example, in one embodiment, the threshold number of cycles may be two, whereas in other embodiments, the threshold number of cycles may be more or less than two. In one embodiment, the threshold number of wait cycles provides the maximum amount of time to wait on a subsequent fusible instruction to be stored to the IQ while maintaining an overall latency/performance advantage in waiting for the subsequent fusible instruction over processing the fusible instructions as separate instructions. In other embodiments, where power is more critical, for example, the threshold number of wait cycles could be higher in order to ensure that extra power is not used to process the two fusible instructions separately, even though the number of wait cycles may cause a decrease (albeit temporarily) in instruction throughput.

Figure 1:
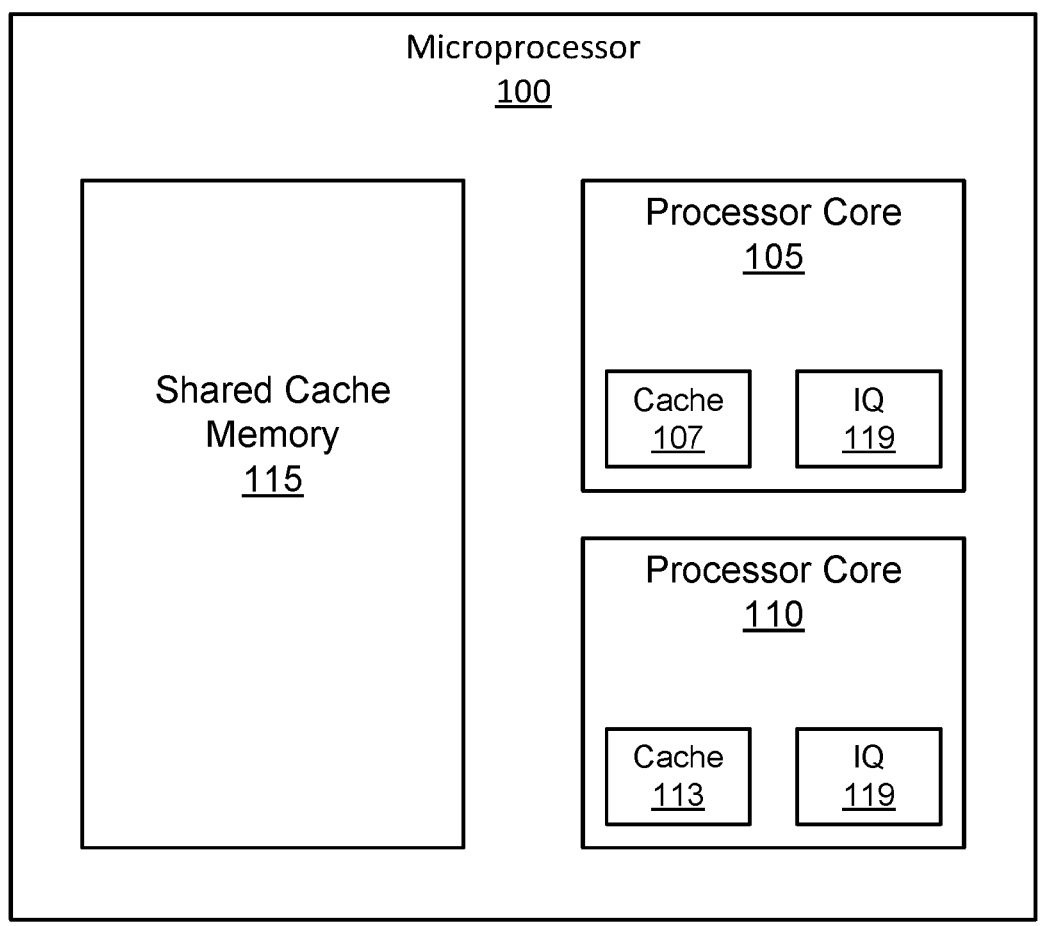
FIG. 1 illustrates a block diagram of a microprocessor, in which at least one embodiment of the invention may be used.

FIG. 1 illustrates a microprocessor in which at least one embodiment of the invention may be used. In particular, FIG. 1 illustrates microprocessor 100 having one or more processor cores 105 and 110, each having associated therewith a local cache 107 and 113, respectively. Also illustrated in FIG. 1 is a shared cache memory 115 which may store versions of at least some of the information stored in each of the local caches 107 and 113. In some embodiments, microprocessor 100 may also include other logic not shown in FIG. 1, such as an integrated memory controller, integrated graphics controller, as well as other logic to perform other functions within a computer system, such as I/O control. In one embodiment, each microprocessor in a multi-processor system or each processor core in a multi-core processor may include or otherwise be associated with logic 119 to enable interrupt communication techniques, in accordance with at least one embodiment. The logic may include circuits, software or both to enable more efficient fusion of instructions than in some prior art implementations.

In one embodiment, logic 119 may include logic to reduce the likelihood of missing instruction fusion opportunities. In one embodiment, logic 119 delays the reading of a first instruction (e.g., CMP) from the IQ, when there is no subsequent instruction stored in the IQ or other fetched instruction storage structure. In one embodiment, the logic 119 causes a delay for a threshold number of cycles (e.g., two cycles) before reading the IQ or issuing the first fusible instruction to a decoder or other processing logic, such that if there is a second fusible instruction that can be fused with the first instruction not yet stored in the IQ (due, for example, to the two fusible instructions being stored in a memory or cache in different storage boundaries), the opportunity to fuse the two fusible instructions may not be missed. In some embodiments, the threshold may be fixed, whereas in other embodiments, the threshold may be variable, modifiable by a user or according to user-independent algorithm. In one embodiment, the first fusible instruction is a CMP instruction and the second fusible instruction is a JCC instruction. In other embodiments, either or both of the first and second instruction may not be a CMP or JCC instruction, but any fusible instructions. Moreover, embodiments of the invention may be applied to fusing more than two instructions.

Figure 2:
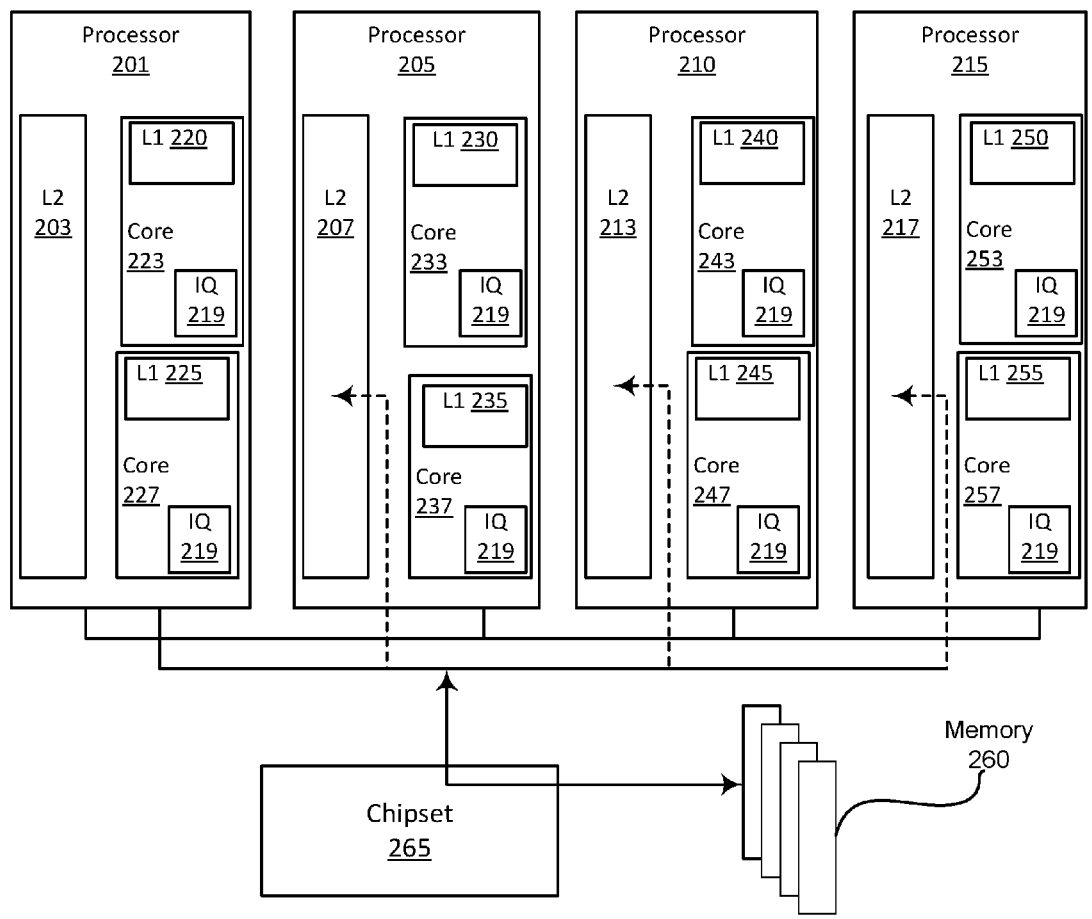
FIG. 2 illustrates a block diagram of a shared bus computer system, in which at least one embodiment of the invention may be used.

FIG. 2, for example, illustrates a front-side-bus (FSB) computer system in which one embodiment of the invention may be used. Any processor 201, 205, 210, or 215 may access information from any local level one (L1) cache memory 220, 225, 230, 235, 240, 245, 250, 255 within or otherwise associated with one of the processor cores 223, 227, 233, 237, 243, 247, 253, 257. Furthermore, any processor 201, 205, 210, or 215 may access information from any one of the shared level two (L2) caches 203, 207, 213, 217 or from system memory 260 via chipset 265. One or more of the processors in FIG. 2 may include or otherwise be associated with logic 219 to enable improved efficiency of instruction fusion, in accordance with at least one embodiment.

Figure 3:
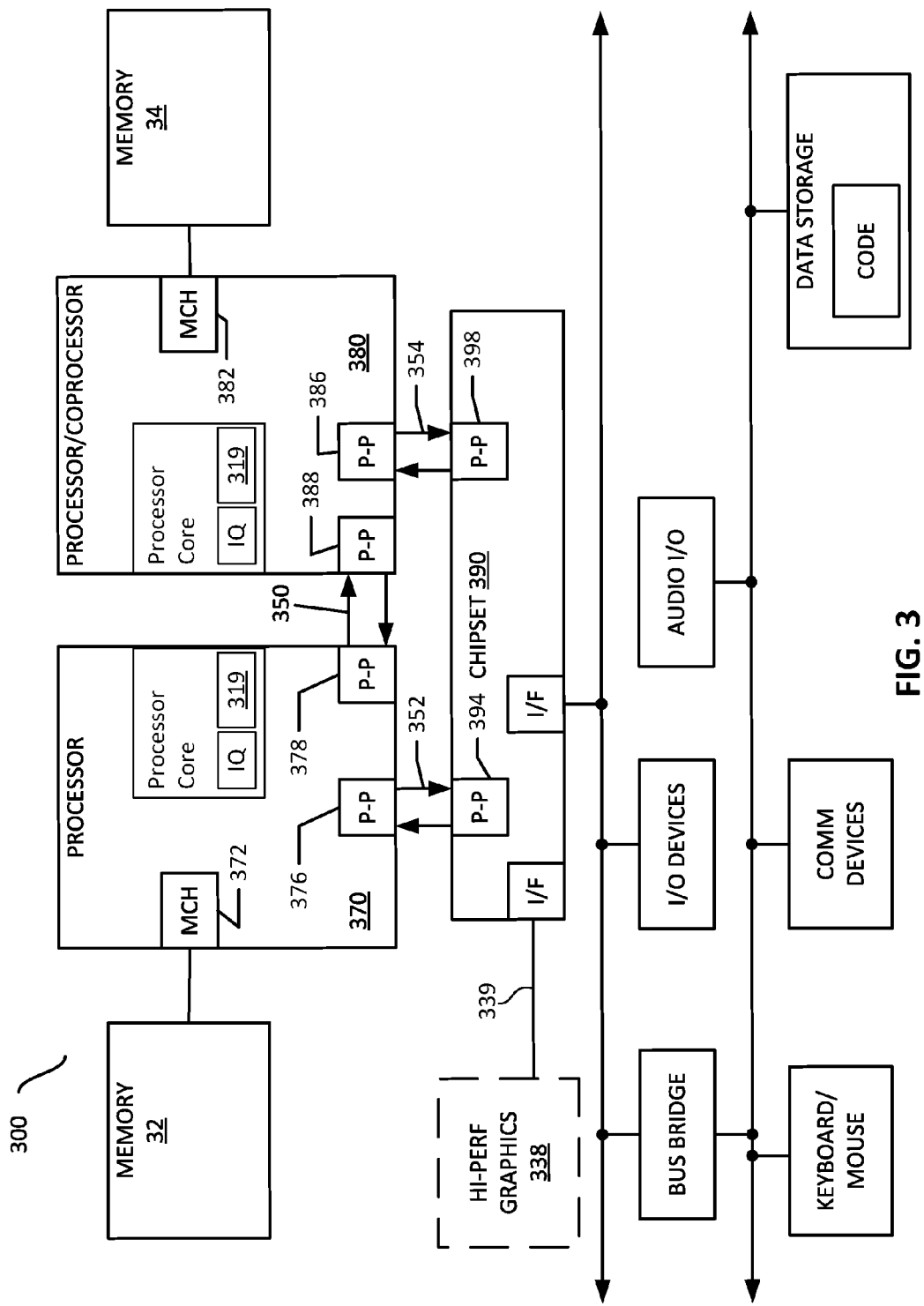
FIG. 3 illustrates a block diagram a point-to-point interconnect computer system, in which at least one embodiment of the invention may be used.

In addition to the FSB computer system illustrated in FIG. 2, other system configurations may be used in conjunction with various embodiments of the invention, including point-to-point (P2P) interconnect systems and ring interconnect systems. The P2P system of FIG. 3, for example, may include several processors, of which only two, processors 370, 380 are shown by example. Processors 370, 380 may each include a local memory controller hub (MCH) 372, 382 to connect with memory 32, 34. Processors 370, 380 may exchange data via a point-to-point (PtP) interface 350 using PtP interface circuits 378, 388. Processors 370, 380 may each exchange data with a chipset 390 via individual PtP interfaces 352, 354 using point to point interface circuits 376, 394, 386, 398. Chipset 390 may also exchange data with a high-performance graphics circuit 338 via a high-performance graphics interface 339. Embodiments of the invention may be located within any processor having any number of processing cores, or within each of the PtP bus agents of FIG. 3. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode. One or more of the processors or cores in FIG. 3 may include or otherwise be associated with logic 319 to enable improved efficiency of instruction fusion, in accordance with at least one embodiment.

In at least one embodiment, a second fusible instruction may not be stored into an IQ before some intermediate operation occurs (occurring between a first and second fusible instruction), such as an IQ clear operation, causing a missed opportunity to fuse the two otherwise fusible instructions. In one embodiment, in which a cache (or a buffer) stores related sequences of decoded instructions (after they were read from the IQ and decoded) or uops (e.g., "decoded stream buffer" or "DSB", "trace cache", or "TC") that are to be scheduled (perhaps multiple times) for execution by the processor, a first fusible uop (e.g., CMP) may be stored in the cache without a fusible second uop (e.g., JCC) within the same addressable range (e.g., same cache way). This may occur, for example, where JCC is crossing a cache line (due to a cache miss) or crossing page boundary (due to a translation look-aside buffer miss), in which case the cache may store the CMP without the JCC. Subsequently, if the processor core pipeline is cleared (due to a "clear" signal being asserted, for example) after the CMP was stored but before the JCC is stored in the cache, the cache stores only the CMP in one of its ways without the JCC.

On subsequent lookups to the cache line storing the CMP, the cache may interpret the missing JCC as a missed access and the JCC may be marked as the append point for the next cache fill operation. This append point, however, may not be found since the CMP+JCC may be read as fused from the IQ. Therefore, the requested JCC may not match any uop to be filled, coming from the IQ, and thus the cache will not be able to fill the missing JCC, but may continually miss on the line in which the fused CMP+JCC is expected. Moreover, in one embodiment in which a pending fill request queue (PFRQ) is used to store uop cache fill requests, an entry that was reserved for a particular fused instruction fill may not deallocate (since the expected fused instruction fill never takes place) and may remain useless until the next clear operation. In one embodiment, a PFRQ entry lock may occur every time the missing fused instruction entry is accessed, and may therefore prevent any subsequent fills to the same location.

In order to prevent an incorrect or undesirable lock of the PFRQ entry, a state machine, in one embodiment, may be used to monitor the uops being read from the IQ to detect cases in which a region that has a corresponding PFRQ entry (e.g., a region marked for a fill) was completely missed, due for example, to the entry's last uop being reached without the fill start point being detected. In one embodiment, the state machine may cause the PFRQ entry to be deallocated when this condition is met. In other embodiments, an undesirable PFRQ entry lock may be avoided by not creating within the cache a fusible instruction that may be read from the IQ without both fusible instructions present. For example, if a CMP is followed by a non-JCC instruction, a fused instruction entry may be created in the cache, but only if the CMP is read out of the IQ alone (after the threshold wait time expires, for example), and a fused instruction entry is not filled to the cache. In other embodiments, the number of times the state machine has detected a fill region that was skipped may be counted, a cache flush or invalidation operation may be performed after some threshold count of times the fill region was skipped. The fill region may then be removed from the cache, and the fused instruction may then be re-filled.

Figure 4:
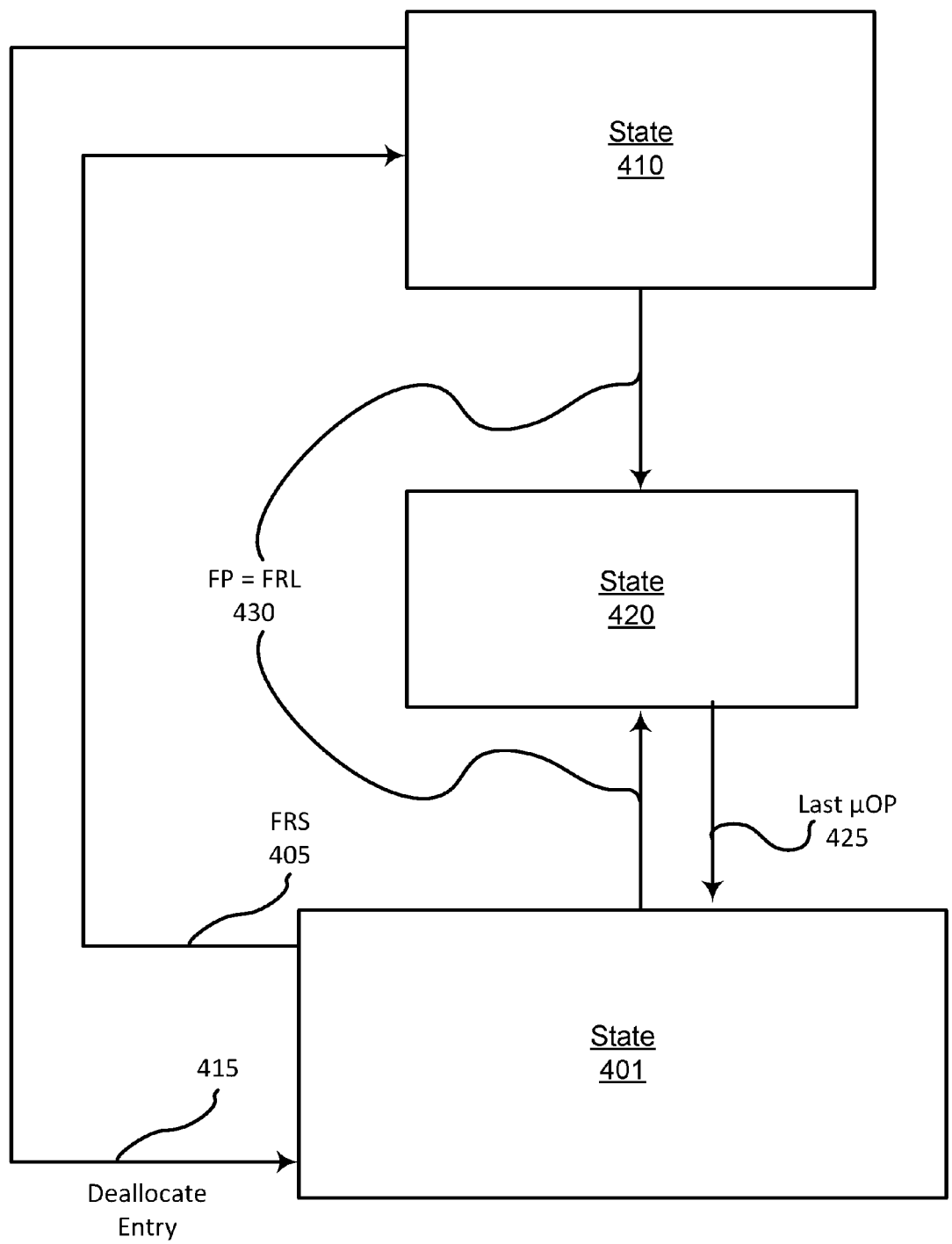
FIG. 4 illustrates a block diagram of a state machine, which may be used to implement at least one embodiment of the invention.

FIG. 4 illustrates a state machine, according to one embodiment, that may be used to avoid unwanted PFRQ entry lock conditions due to a missed fusible instruction in the IQ. At state 401, in which the instructions in the IQ are not in a region marked for fill, a "fill region start" (FRS) signal indicating that the IQ is about to process an instruction that is mapped to a fill-region (an instruction from the fill region according to the cache hashing) but does not start at the linear instruction pointer saved in the PFRQ ("lip") 405. This may cause the state machine to move to state 410. If the next instruction in the IQ (that will soon be decoded) ends a fill region (e.g. ends a line as hashed by the cache, or is a taken branch), then the state machine causes the deallocation 415 of the corresponding PFRQ entry and the state machine returns to state 401. If, however, the fill pointer (FP) is equal to the fill region lip (FRL) 430 while either in state 401 or state 410, the state machine enters state 420, in which the access is within the fill region and after fill start point. From state 420, a last uop in the fill region indication will return 425 the state machine to state 401 without deallocation of the corresponding PFRQ entry. The state machine of FIG. 4 may be implemented in hardware logic, software, or some combination thereof. In other embodiments, other state machines or logic may be used.

Figure 5:
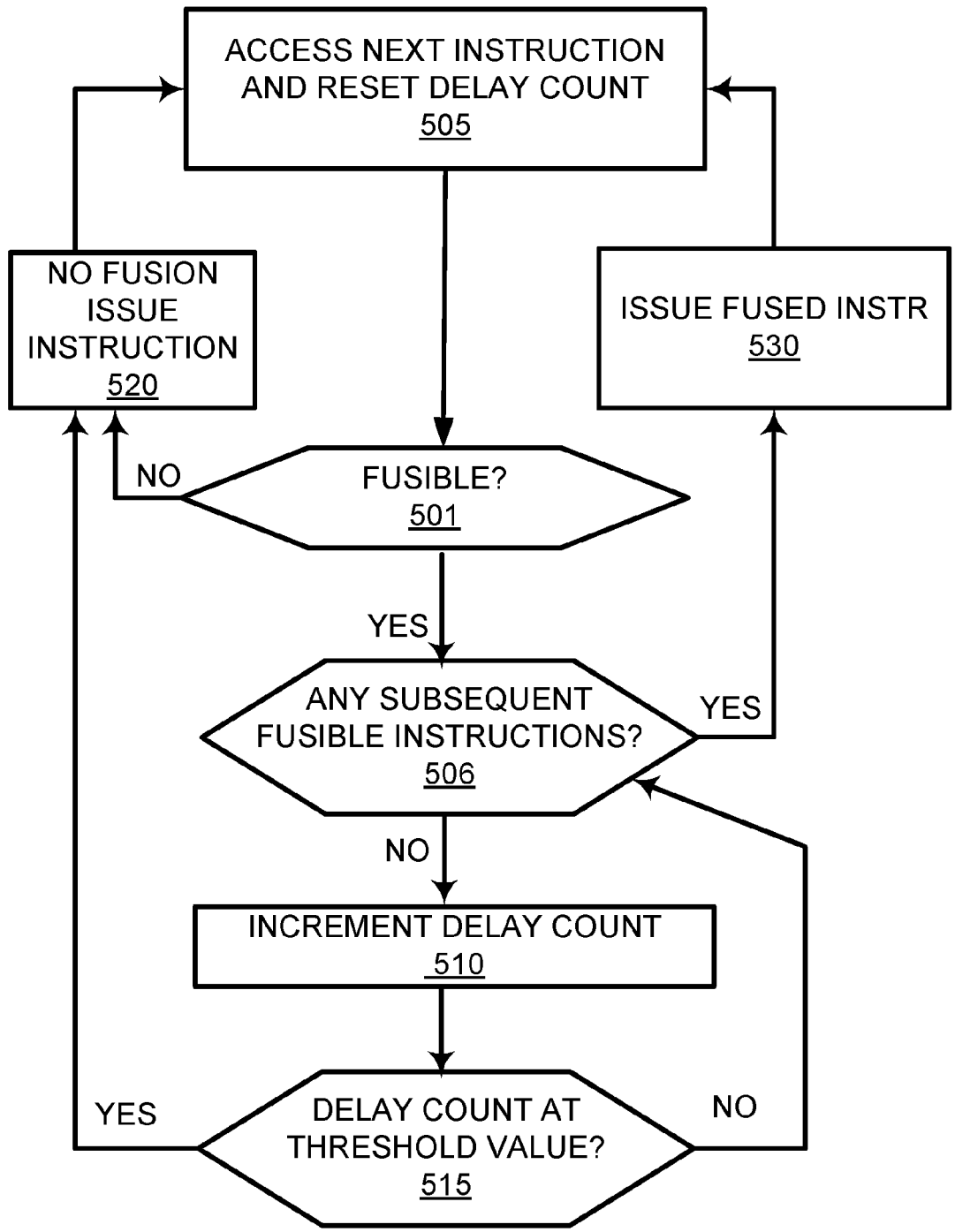
FIG. 5 is a flow diagram of operations that may be used for performing at least one embodiment of the invention.

FIG. 5 illustrates a flow diagram of operations that may be used in conjunction with at least one embodiment of the invention, to delay processing of a first fusible instruction for a threshold amount of time, such that a second fusible instruction may be fused with the first fusible instruction if the second fusible instruction is stored within the IQ within a threshold amount of time. At operation 501, it is determined whether the currently accessed instruction in the IQ is fusible with any subsequent instruction, i.e. whether to delay processing of the first fusible instruction. In some embodiments processing may be delayed only if the first fusible instruction is also the last instruction stored in the IQ. If the currently accessed instruction in the IQ is not fusible with any subsequent instruction, then the flow of operations for the currently accessed instruction in the IQ is complete, the instruction is issued without fusion at operation 520, and at operation 505, the next instruction is accessed from the IQ and the delay count is reset. If the currently accessed instruction in the IQ is fusible with any subsequent instruction, then at operation 506 it is determined whether any subsequent fusible instructions are stored within the IQ, and, if not, at operation 510, a delay counter is incremented and at operation 515 it is determined whether the delay count threshold is reached. If it isn't, then the flow returns to operation 506, but if it is, then at operation 520, no instruction fusion of the currently accessed instruction is performed. If it is determined at operation 506 that a subsequent fusible instruction is stored in the IQ, then fusion is performed at operation 530, and, at 505, the next instruction is accessed and the delay count is reset. As shown, the flow of operations then returns to operation 501. For clarity, it will be appreciated that upon completion of the illustrated flow of operations for the currently accessed instruction, the flow always reiterates starting at operation 501 where it is again determined whether the currently accessed instruction in the IQ is a first fusible instruction. It will be appreciated that in some prior art processors both fusible instructions may need to reside in the IQ concurrently. Therefore, delaying the currently accessed instruction in the IQ from being issued increases the probability of this concurrent storage occurring until the count reaches the threshold. In other embodiments, other operations may be performed to improve the efficiency of instruction fusion.

Figure 6:
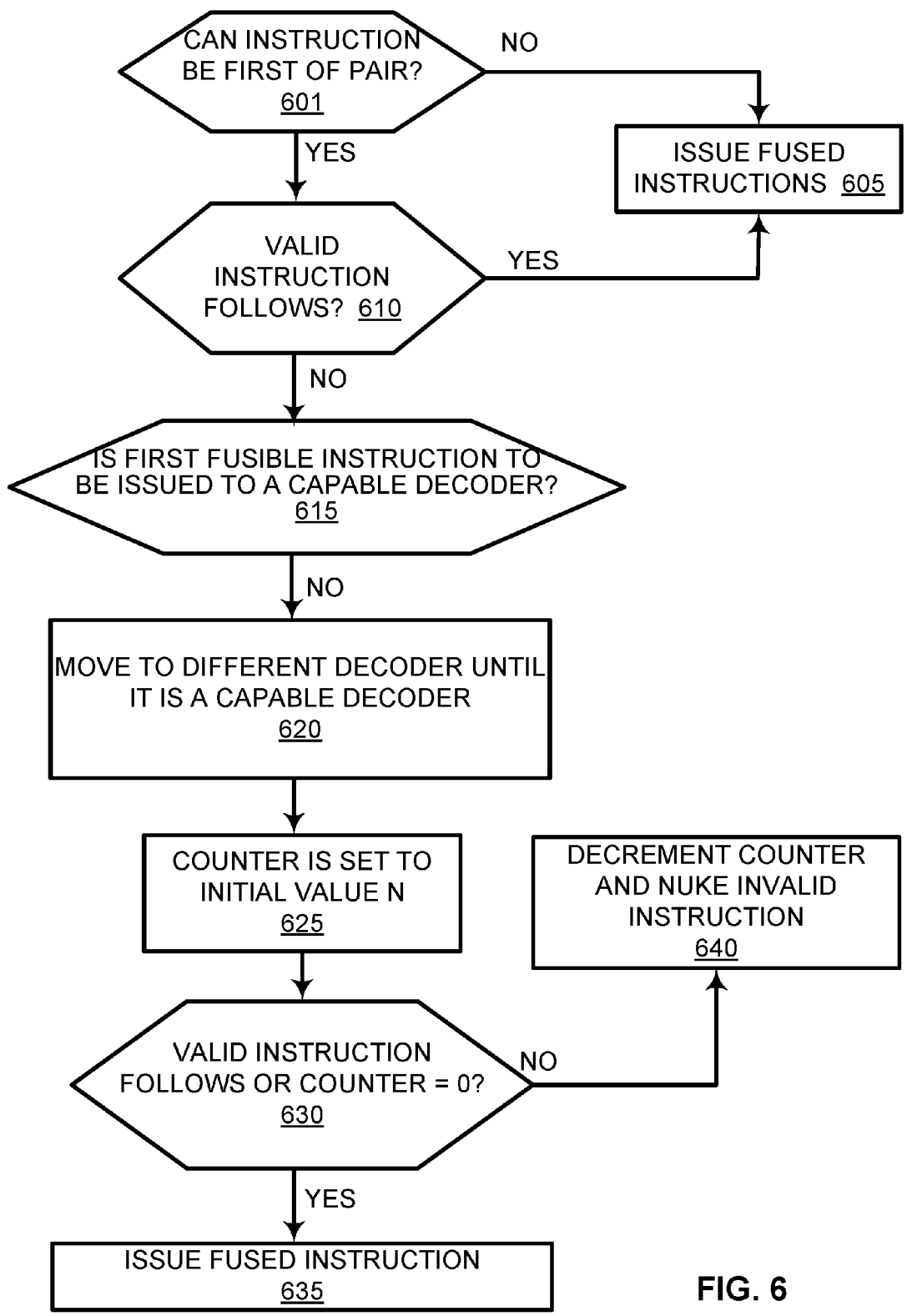
FIG. 6 is a flow diagram of operations that may be performed in at least one embodiment.

FIG. 6 illustrates a flow diagram of operations that may be performed in conjunction with at least one embodiment. In order to perform one embodiment in processors having a number of decoder circuits, it may be helpful to ensure that the first fusible instruction is to be decoded on a particular decoder circuit, which is capable of decoding the fused instruction. In FIG. 6, it is determined whether a particular instruction can be a first of a fused pair of instructions at operation 601. If not, then the fused instructions are issued at operation 605. If so, then it is determined whether the first fusible instruction is followed by a valid instruction in the IQ at operation 610. If so, then the fused instructions are issued at operation 605. If not, then at operation 615, it is determined whether the first fusible instruction is to be issued to a decoder capable of supporting the fused instruction. In one embodiment, decoder-0 is capable of decoding the fused instructions. If the first fusible instruction was not issued to decoder-0, then at operation 620, the first fusible instruction is moved, or "nuked", to a different decoder until it corresponds to decoder-0. At operation 625, a counter is set to an initial value, N and at operation 630, if the instruction is followed by a valid instruction or the counter is zero, then the fused instructions are issued at operation 635. Otherwise, at operation 640, the counter is decremented and the invalid instruction is nuked. In other embodiments, the counter may increment to a final value. In other embodiments, other operations, besides a nuke operation may clear the invalid instruction.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor.

Thus, a method and apparatus for directing micro-architectural memory region accesses has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising:
    an instruction queue (IQ); and
    logic to delay processing of a first fusible instruction for a threshold amount of time, such that a second fusible instruction, fusible with the first fusible instruction, may be fused with the first fusible instruction if the second fusible instruction is stored within the IQ within the threshold amount of time, wherein the logic includes a counter to be incremented once for each cycle after the first fusible instruction is stored in the IQ and is the last instruction in the IQ until a threshold number of cycles corresponding to the threshold amount of time is reached.

2. The apparatus of claim 1, wherein the first fusible instruction and the second fusible instruction are stored across a fetch boundary prior to being stored in the IQ.

3. The apparatus of claim 1, wherein the logic is to delay processing of the first fusible instruction only if the first fusible instruction is the last instruction stored in the IQ.

4. A method comprising:
   determining whether a currently accessed instruction within an instruction queue (IQ) is fusible with any subsequent instruction to be stored in the IQ;
   accessing a next instruction from the IQ and resetting a delay counter if it is determined that said currently accessed instruction is not fusible with any subsequent instruction to be stored in the IQ; and
   incrementing the delay counter if it is determined that said currently accessed instruction is fusible and if said currently accessed instruction is the last instruction in the IQ.

5. The method of claim 4, further comprising fusing the currently accessed instruction with a given subsequent instruction if the currently accessed instruction and said given subsequent instruction are fusible and the delay counter has not reached a threshold value.

6. The method of claim 5, further comprising processing said currently accessed instruction separately from said given subsequent instruction if said currently accessed instruction and said given subsequent instruction are not fusible.

7. The method of claim 5, further comprising processing said currently accessed instruction separately from said given subsequent instruction if the delay counter has reached the threshold value.

8. A system comprising:
   a storage to store a first and second fusible instruction within a first and second access boundary, respectively;
   a processor having fetch logic to fetch the first and second fusible instructions into an instruction queue (IQ);
   a delay logic circuit to delay reading of the first fusible instruction from the IQ for a threshold amount of cycles; and
   an instruction fusion logic circuit to fuse the first and second fusible instructions if the second fusible instruction is stored in the IQ after the first fusible instruction and before the threshold amount of cycles has been reached, wherein the first fusible instruction is a compare or test (CMP/TEST) instruction and the second fusible instruction is a conditional jump (JCC) instruction.

9. A system comprising:
   a storage to store a first and second fusible instruction within a first and second access boundary, respectively;
   a processor having fetch logic to fetch the first and second fusible instructions into an instruction queue (IQ);
   a counter to delay reading of the first fusible instruction from the IQ for a threshold amount of cycles, the counter to increment if the first fusible instruction is the only instruction in the IQ and to stop counting when the threshold amount of cycles has been reached; and
   an instruction fusion logic circuit to fuse the first and second fusible instructions if the second fusible instruction is stored in the IQ after the first fusible instruction and before the threshold amount of cycles has been reached.

10. The system of claim 9, wherein the counter is to reset if the second fusible instruction is stored in the IQ before the threshold amount of cycles has been reached.

11. The system of claim 9, wherein the fusion logic circuit is to fuse the first and second fusible instructions before the threshold amount of cycles has been reached.

12. The system of claim 9, wherein the storage includes an instruction cache and the first and second boundary sizes are each 64 bytes.

13. The system of claim 9, wherein the storage includes a dynamic random-access memory and the first and second boundary sizes are each 4096 bytes.

14. The system of claim 9, wherein the first fusible instruction is a compare or test (CMP/TEST) instruction and the second fusible instruction is a conditional jump (JCC) instruction.

15. The system of claim 14, wherein the threshold amount of cycles is two.

* * * * *